(12) United States Patent
Jung et al.

(10) Patent No.: US 8,970,509 B2
(45) Date of Patent: Mar. 3, 2015

(54) TOUCH PANEL AND LIQUID CRYSTAL DISPLAY DEVICE INCLUDING THE SAME

(75) Inventors: Gang-Seob Jung, Seoul (KR);
Sang-Soo Hwang, Seoul (KR);
Young-Jin Yi, Paju-si (KR); Jung-Hyun Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 605 days.

(21) Appl. No.: 12/778,566

(22) Filed: May 12, 2010

(65) Prior Publication Data
US 2011/0134055 A1    Jun. 9, 2011

(30) Foreign Application Priority Data

Dec. 9, 2009 (KR) .................. 10-2009-0121780
Mar. 23, 2010 (KR) .................. 10-2010-0025712

(51) Int. Cl.
*G06F 3/041* (2006.01)
*G06F 3/045* (2006.01)
*G02F 1/1335* (2006.01)
*A61N 5/00* (2006.01)
*G21G 5/00* (2006.01)
*G06F 3/044* (2006.01)

(52) U.S. Cl.
CPC ...... *G06F 3/044* (2013.01); *G06F 2203/04111* (2013.01)
USPC ........... 345/173; 345/174; 250/492.2; 349/96

(58) Field of Classification Search
CPC ....................................................... G06F 3/044
USPC ................ 345/81, 104, 173–174; 178/18.06, 178/18.03; 361/152; 257/773, 194; 250/492.2
See application file for complete search history.

(56) References Cited

U.S. PATENT DOCUMENTS

| 5,118,952 A * | 6/1992 | Sakamoto et al. ......... 250/492.2 |
| 6,054,979 A | 4/2000 | Sellers |
| 2005/0030048 A1 | 2/2005 | Bolender et al. |
| 2005/0121797 A1 * | 6/2005 | Hsueh-Ming ................. 257/773 |

(Continued)

FOREIGN PATENT DOCUMENTS

| CN | 2010787694 Y | 6/2008 |
| CN | 101515212 A | 8/2009 |

(Continued)

OTHER PUBLICATIONS

German Office Action dated Apr. 9, 2014.

*Primary Examiner* — Quan-Zhen Wang
*Assistant Examiner* — Lin Li
(74) *Attorney, Agent, or Firm* — Birch, Stewart, Kolasch & Birch, LLP

(57) ABSTRACT

A touch panel includes a plurality of first sensors disposed on a substrate, the plurality of first sensors including a plurality of first electrodes spaced from one another in a first direction and a first connection pattern to connect two adjacent first electrodes, the plurality of first sensors arranged in a second direction crossing the first direction; a plurality of second sensors disposed on the substrate, the plurality of second sensors including a plurality of second electrodes spaced from one another in the second direction and a second connection pattern composed of a metal to connect two adjacent second electrodes, the plurality of second sensors arranged in the first direction; and at least one metal pattern connected to the first connection pattern, wherein the at least one metal pattern overlaps the first connection pattern.

10 Claims, 10 Drawing Sheets

(56) References Cited

U.S. PATENT DOCUMENTS

| | | |
|---|---|---|
| 2005/0180083 A1* | 8/2005 | Takahara et al. .............. 361/152 |
| 2007/0240914 A1 | 10/2007 | Lai et al. |
| 2008/0264699 A1 | 10/2008 | Chang et al. |
| 2009/0078966 A1* | 3/2009 | Asai et al. ..................... 257/194 |
| 2009/0085885 A1 | 4/2009 | Wu et al. |
| 2009/0160682 A1 | 6/2009 | Bolender et al. |
| 2009/0160824 A1 | 6/2009 | Chih-Yung et al. |
| 2009/0236151 A1* | 9/2009 | Yeh et al. .................... 178/18.03 |
| 2010/0045613 A1* | 2/2010 | Wu et al. ........................ 345/173 |
| 2010/0045903 A1* | 2/2010 | Aruga et al. ..................... 349/96 |
| 2010/0073310 A1 | 3/2010 | Liang et al. |
| 2010/0123674 A1* | 5/2010 | Wu et al. ........................ 345/173 |
| 2010/0149117 A1* | 6/2010 | Chien et al. .................... 345/173 |
| 2010/0164900 A1* | 7/2010 | Lin ................................ 345/174 |
| 2011/0007020 A1* | 1/2011 | Hong et al. .................... 345/174 |
| 2011/0057887 A1* | 3/2011 | Lin et al. ....................... 345/173 |

FOREIGN PATENT DOCUMENTS

| | | |
|---|---|---|
| EP | 1 986 084 A1 | 10/2008 |
| KR | 10-2009-0111783 A | 10/2009 |
| KR | 10-2009-0119600 A | 11/2009 |
| TW | 200519472 A | 6/2005 |
| TW | M344544 | 11/2008 |
| TW | M364912 | 9/2009 |
| TW | 2009-49655 | 12/2009 |

* cited by examiner

TOUCH PANEL AND LIQUID CRYSTAL DISPLAY DEVICE INCLUDING THE SAME

This application claims the priority and the benefit of Korean Patent Application No. 10-2009-0121780, filed on Dec. 9, 2009 and No. 10-2010-0025712, filed on Mar. 23, 2010, each disclosure of which is hereby incorporated by reference in its entirety.

BACKGROUND OF THE INVENTION

1. Field of the Invention

The present invention relates to a touch panel. More specifically, the present invention relates to a capacitive touch panel to decrease resistance at an intersection where electrodes cross each other, prevent signal and sensing delays caused by resistance and thus improve touch sensitivity, and a liquid crystal display device integrated with the touch panel.

2. Discussion of the Related Art

In accordance with the recent information-dependent society, displays to visualize electric information signals have been rapidly developed. Various slim, lightweight, and low-power flat display devices are commonly used as alternatives to conventional cathode ray tubes (CRTs).

Examples of flat display devices include liquid crystal displays (LCDs), plasma display panels (PDPs), field emission displays (FEDs), electroluminescent displays (ELDs) and the like. These flat display devices necessarily require a flat display panel to realize an image wherein the flat display panel has a structure in which a pair of transparent insulating substrates is joined such that an inherent luminous or polarized material layer is interposed between the substrates. Among flat display devices, liquid crystal display devices control light transmittance of liquid crystals using an electric field to display an image. For this purpose, an image display device includes a display panel including liquid crystal cells, a backlight unit to irradiate light to the display panel and an operation circuit to operate liquid crystal cells.

The display panel is formed such that a plurality of gate lines cross a plurality of data lines to define a plurality of unit pixel regions. Each pixel region includes a thin film transistor array substrate and a color filter array substrate facing each other, a spacer interposed between the two substrates to maintain a predetermined cell gap, and a liquid crystal filled in the cell gap.

The thin film transistor array substrate includes a plurality of gate lines and a plurality of data lines, a thin film transistor formed as a switching device at each intersection between the gate line and the data line, a pixel electrode arranged in each liquid crystal cell and connected to the thin film transistor, and an orientation film coated on the resulting structure. The gate lines and data lines receive signals through respective pad portions from operation circuits.

In response to scan signals supplied to the gate lines, the thin film transistor transfers pixel voltage signals supplied to data lines to the pixel electrode.

In addition, the color filter array substrate includes color filters arranged in respective liquid crystal cells, a black matrix to partition the color filters and reflect external light, a common electrode to supply a reference voltage to the liquid crystal cells, and an orientation film coated on the resulting structure.

The thin film transistor substrate and the color filter array substrate thus separately formed are arranged and then joined such that the two substrates face each other, liquid crystal is injected into a region provided between the substrates, and the region is sealed, to complete fabrication of the liquid crystal display device.

There is an increasing need for providing a touch panel wherein a portion that is touched by the hand or separate input means is sensed, and additional information can be transferred in response to the touch, to the liquid crystal display device thus fabricated. Such a touch panel is adhered to the external surface of a liquid crystal display.

Depending on the touch sensation type, touch panels are classified into resistive touch panels, capacitive touch panels and infrared (IR) touch panels. Owing to factors such as convenience of fabrication and sensitivity, capacitive touch panels have attracted considerable attention.

Hereinafter, a capacitive touch panel according to the present invention will be described with reference to the annexed drawings in detail.

FIG. 1 is a plan view illustrating an electrode intersection of conventional touch panel.

As shown in FIG. 1, the conventional capacitive touch panel includes a plurality of first electrodes 13 and a plurality of second electrodes 14 arranged in different directions on a substrate 10.

The second electrodes 14 are formed by connecting connection portions with a small width to diamond patterns connected in a longitudinal direction, and the first electrode 13 and the second electrode 14 are branched into each other at the intersection therebetween. At the second electrode 14, the diamond patterns are integrated with the connection portions and the first electrode 13 is formed with diamond patterns spaced from one another.

An insulating film 12 is formed under the first electrodes 13 and the second electrodes 14, a connection metal 11 is further formed on the substrate 10 in a region provided between the divided first electrodes 13. Accordingly, the connection metal 11 electrically contacts the first electrode 13 at a contact hole 12a to partially expose the connection metal 11, thus allowing common signals to be applied to the separated first electrodes 13.

The first and second electrodes 13 and 14 are transparent electrodes.

In this instance, the second electrode 14, except for the connection portion, has a diamond shape, and in practical application, the connection portion to connect diamond patterns of the second electrode 14 has a considerably small width and thus considerably large resistance.

The first electrodes 13 are connected through the connection metal 11 composed of a metal. For this reason, there is a great difference in resistance between the connection portion of the first electrode 13 and the connection portion of the second electrode 14 due to differences in material and structure therebetween. The great difference in resistance causes deterioration in application of operation voltage due to RC delay, taking into consideration the fact that electrodes include a plurality of these connection portions, thus the deterioration in sensitivity of touch. Specifically, resistance at the connection portion of the second electrode 14 corresponds to 20% or higher of resistance of one diamond pattern, which is high when compared to its area.

In addition, the connection portion of the second electrode 14 having a high resistance composed of a transparent electrode material may be readily damaged during static electricity testing and thus be shorted or seriously damaged. In this instance, the use of the panel may be impossible.

The conventional touch panel has the following disadvantages.

One of the first electrode and the second electrode which cross each other are arranged in one direction and the other thereof are spaced from one another at the connection portion, and a second bridge electrode is provided under the electrode, to connect the electrodes.

In this instance, the first and second electrodes are composed of a transparent electrode material and the electrodes arranged lengthways in one direction have a small width and thus a considerably high resistance at the connection portion.

The connection portion having a high resistance causes RC delay of electrodes and deterioration in sensitivity and operation voltage and inhibits sensitive touch detection.

In addition, the connection portion of the electrodes having a high resistance composed of a transparent electrode material may be readily damaged upon static electricity tests and be thus shorted or seriously damaged. In this instance, the use of the panel may be impossible.

SUMMARY OF THE INVENTION

Accordingly, the present invention is directed to a touch panel and a liquid crystal display device including the same that substantially obviate one or more problems due to limitations and disadvantages of the related art.

It is one object of the present invention to provide a capacitive touch panel to decrease resistance at intersections where electrodes cross each other, prevent or reduce signal and sensing delays caused by resistance and thus improve touch sensitivity, and a liquid crystal display device integrated with the touch panel.

To achieve these objects and other advantages and in accordance with the purpose of the invention, as embodied and broadly described herein, provided is a touch panel including a plurality of first sensors disposed on a substrate, the plurality of first sensors including a plurality of first electrodes spaced from one another in a first direction and a first connection pattern to connect two adjacent first electrodes; a plurality of second sensors disposed on the substrate, the plurality of second sensors including a plurality of second electrodes spaced from one another in a second direction crossing the first direction and a second connection pattern composed of a metal to connect two adjacent second electrodes; and at least one metal pattern connected to the first connection pattern, wherein the at least one metal pattern overlaps the first connection pattern.

A liquid crystal display device includes a liquid crystal panel including a first substrate, a second substrate, and a liquid crystal layer disposed between the first and second substrates; an insulating layer arranged on a surface of the second substrate; a plurality of first sensors disposed on the insulating layer, the plurality of first sensors including a plurality of first electrodes spaced from one another in a first direction and a first connection pattern to connect two adjacent first electrodes, the plurality of first sensors arranged in a second direction crossing the first direction; a plurality of second sensors on the insulating layer, the plurality of second sensors including a plurality of second electrodes spaced from one another in the second direction and a second connection pattern composed of a metal to connect two adjacent second electrodes; at least one metal pattern overlapping the first connection pattern on the second substrate; and a first contact portion in the insulating layer to connect both ends of the second connection pattern to the adjacent second electrodes, and a second contact portion in the insulating layer to connect both ends of the at least one metal pattern to the first connection pattern.

It is to be understood that both the foregoing general description and the following detailed description of the present invention are examples and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings.

DETAILED DESCRIPTION OF THE INVENTION

Hereinafter, a touch panel and a liquid crystal display device including the same according to the present invention will be described with reference to the annexed drawings in detail.

Figure 1:
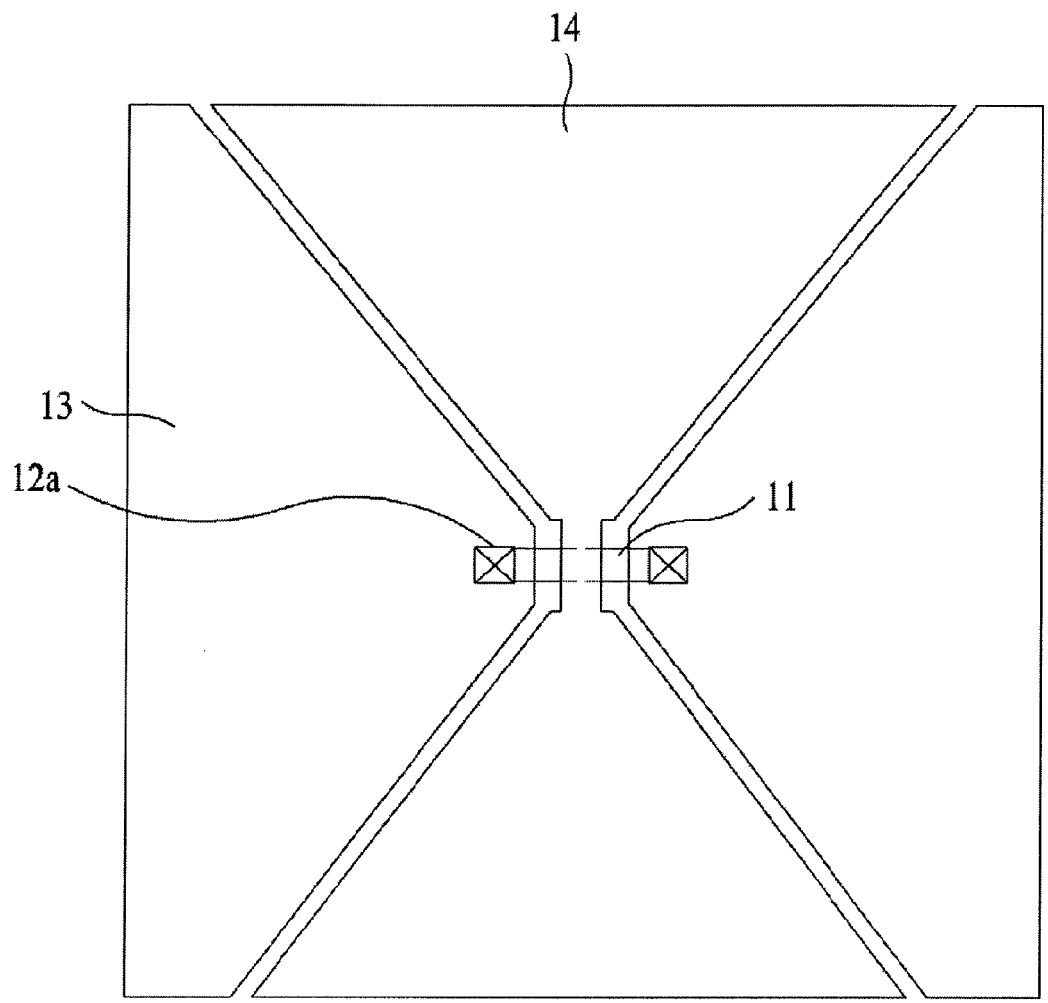
FIG. 1 is a plan view illustrating an electrode intersection of a conventional touch panel.
Figure 2:
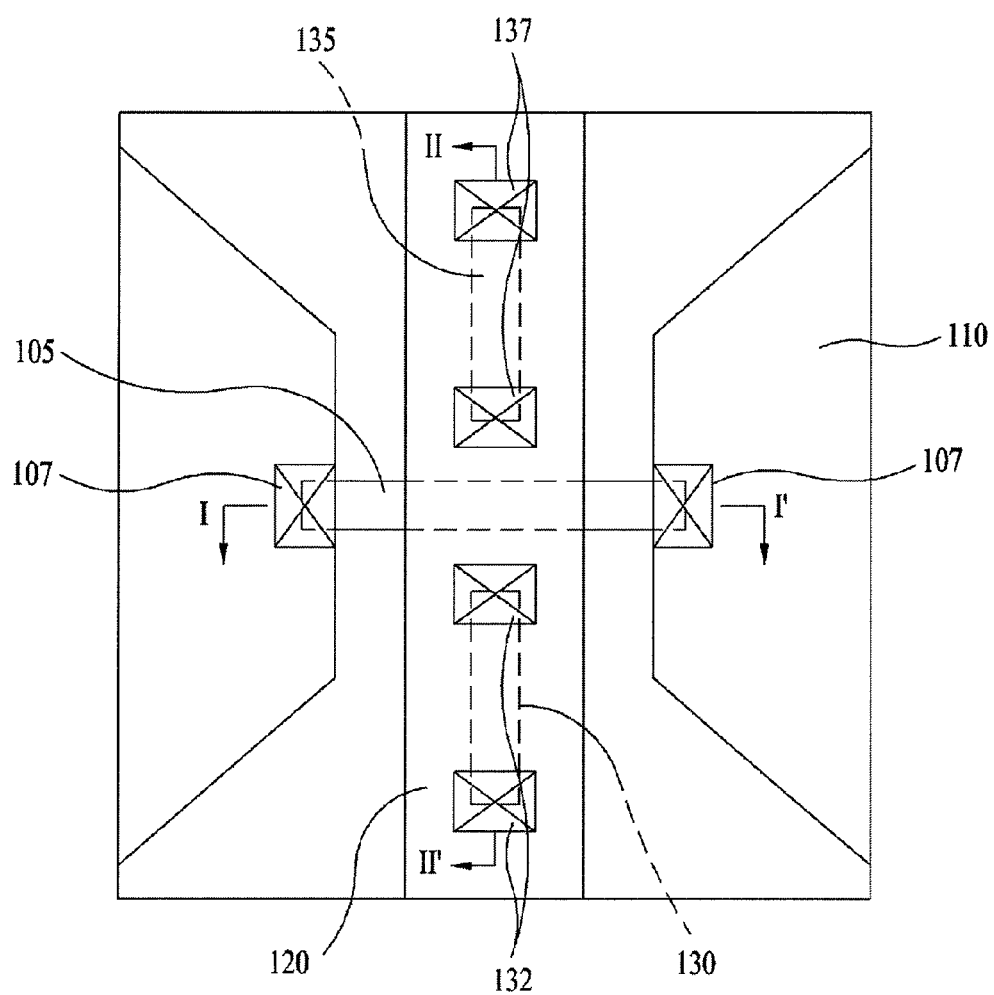
FIG. 2 is a plan view illustrating an electrode intersection of a touch panel according to a first embodiment of the present invention.
Figure 3A:
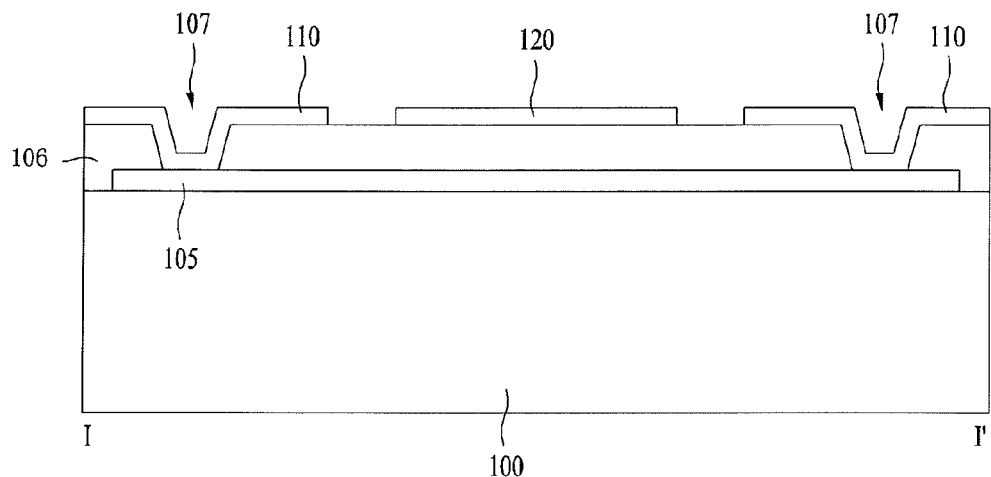
FIGS. 3A and 3B are sectional views taken along the lines I-I' and II-II' of FIG. 2.
Figure 3B:
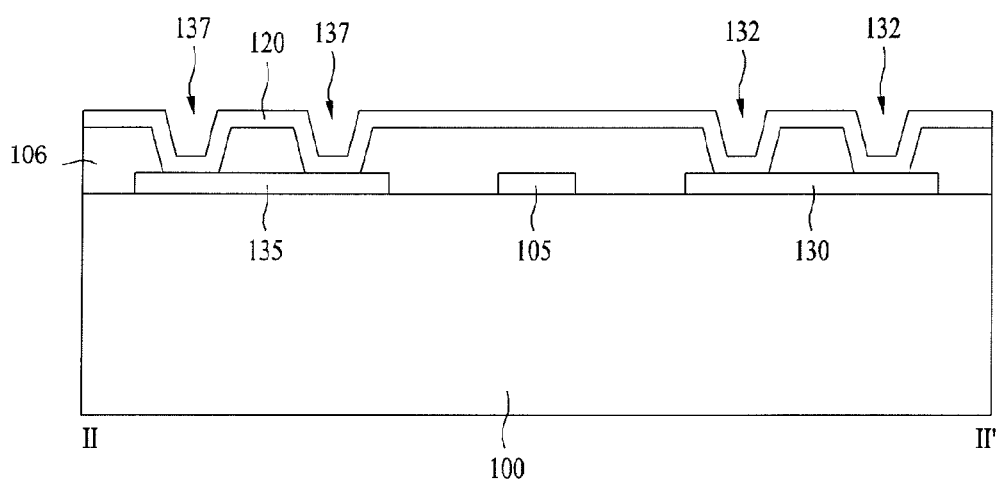

FIG. 2 is a plan view illustrating an electrode intersection of a touch panel according to a first embodiment of the present invention. FIGS. 3A and 3B are sectional views taken along the lines I-I' and II-II' of FIG. 2.

Figure 6A:
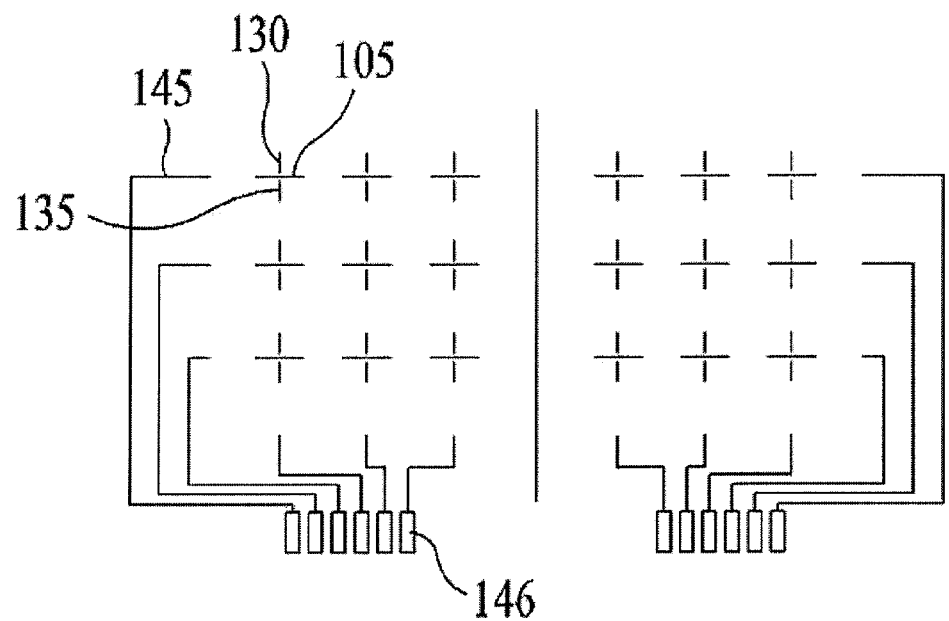
FIGS. 6A to 6C are plan views illustrating an electrode intersection of a touch panel according to the present invention.
Figure 6B:
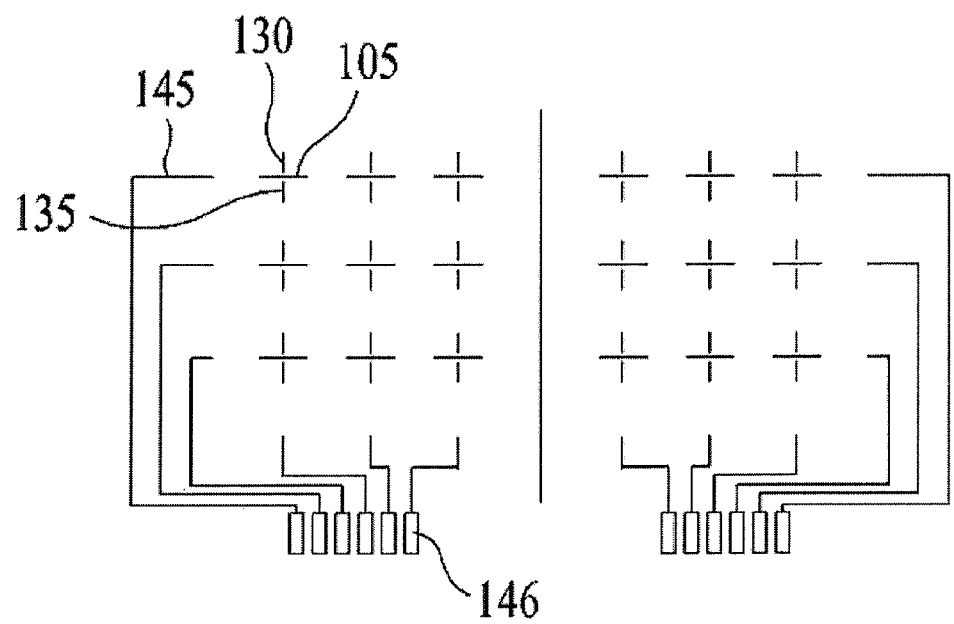
Figure 6C:
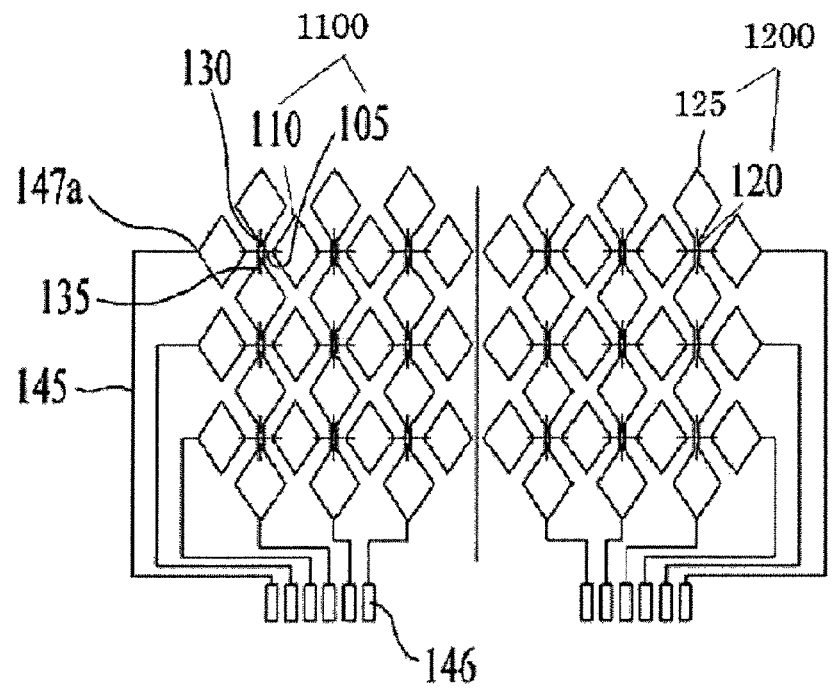

As shown in FIGS. 2 to 3B, with reference to FIG. 6C, the touch panel of the first embodiment includes a first sensor 1200 and a second sensor 1100 arranged on a substrate 100 such that they cross each other. The bridge (channel) of the first sensor 1200 is further provided with metal patterns 130 and 135 to reduce resistance therein. Referring to FIGS. 6A to 6C and 2, a first direction is a Y axial direction and a second direction is an X axial direction, or vice versa.

The first sensor 1200 includes a plurality of first electrodes (see reference numeral 125 of FIG. 6C) in the form of diamond patterns spaced from one another in the first direction integrated with a first bridge electrode (or first connection pattern) 120 composed of a transparent electrode, to connect the adjacent first electrodes on the insulating film (or insulating layer) 106 present on the substrate 100.

The second sensor 1100 includes a plurality of transparent second electrodes in the form of diamond patterns spaced from one another in the second direction on the insulating film 106 in a region where the first electrodes are not formed and a second bridge electrode (or connection pattern) 105 composed of a metal to connect the adjacent second electrodes.

The first bridge electrode 120 and the second bridge electrode 105 are composed respectively of a transparent electrode and a metal, which are arranged in different layers, to electrically connect adjacent first electrodes or second electrodes.

The transparent electrode has a specific resistance 20-fold or higher than a metal, thus causing differences in resistance between the first and second bridge electrodes 120 and 105. That is, the first bridge electrode 120 composed of a transparent electrode has a higher resistance. In order to reduce resistance of the first bridge electrode 120, metal patterns 130 and 135 are formed in the same layer as the second bridge electrode 105.

The first and second metal patterns 130 and 135 correspond to adjacent first bridge electrodes 120 and reduce resistance of connection patterns of first electrodes composed of a transparent electrode having a high resistance, to the resistance of the second bridge electrode 105 that connects spaced second electrodes 110.

The first electrodes 125 and the first bridge electrode 120 constituting the first sensor 1200, and the second electrode 110 constituting the second sensor 1100 are transparent electrodes.

The first sensor 1200, metal patterns 130 and 135 formed in different layers from the second electrodes 110, and the second bridge electrode 105 are connected through contact holes provided on the insulating film 106. That is, the insulating film 106 is provided with a first contact hole 107 to expose both ends of the second bridge electrode 105, to electrically connect the second bridge electrode 105 to the adjacent second electrodes 110. The insulating film 106 is provided with second contact holes 132 and 137 to expose both ends of metal patterns 130 and 135, to connect the metal patterns 130 and 135 to the first bridge electrode 120 overlapping the same.

At this time, the metal patterns 130 and 135 are arranged in the same layer as the second bridge electrode 105. Accordingly, the metal patterns 130 and 135 are divided into a first metal pattern 130 and a second metal pattern 135 in the first direction, such that the second bridge electrode 105 is interposed therebetween.

The second contact holes 132 and 137 are arranged at both ends of the first metal pattern 130 and the second metal pattern 135.

The second bridge electrode 105 and the metal patterns 130 and 135 may be composed of at least one metal selected from molybdenum (Mo), copper (Cu), silver (Ag), chromium (Cr), aluminum (Al), aluminum neodymium (AlNd) and molybdenum titanium (MoTi), or a laminate including the at least one metal.

The metal has about a $\frac{1}{20}$ decreased specific resistance, as compared to the first bridge electrode 120a composed of a transparent electrode, thus considerably decreasing resistance, although the first bridge electrode 120 has an area smaller than that of the first electrode 125.

In one embodiment, the second bridge electrode 105 and the metal patterns 130 and 135 may take the form of a double-layer laminate including chromium (Cr) and chromium oxide (CrOx). In this instance, chromium absorbs external light well, thus preventing or reducing glare of the metal surface and thus exposure of metal patterns to a user.

The metal patterns 130 and 135 have a width of 3 to 20 µm, and the first bridge electrode 125 has a width of 10 µm to 500 µm which is larger than that of the metal patterns 130 and 135.

In this instance, a lower limit (3 µm) of the first and second metal patterns 130 and 135 is within an acceptable resolution level. Widths smaller than the lower limit are possible in the case of improved techniques and thus improved resolution. In addition, the upper limit, 20 µm, is an invisible maximum width (an upper maximum that avoids being visible), and the metal patterns 130 and 135 and the second bridge electrode 105 have a width smaller than the upper limit, 20 µm. In some cases, the width is determined within a range enabling reduction of resistance of the first and second metal patterns 130 and 135 and the first bridge electrode 120.

The first sensor 1200 and the second sensor 1100 may be arranged in X and Y directions, or vice versa. The first and second electrodes 125 and 110 and the first bridge electrode 120 are composed of a transparent electrode. Accordingly, it is preferable, but not required, to apply the first sensor integrated with a transparent electrode at the side having a shorter electrode length among X and Y directions, in view of decrease in resistance.

Meanwhile, in the aforementioned first embodiment, the metal patterns 130 and 135 and the second bridge electrode 105 may be formed in the same layer (coplanar). Alternatively, they may be formed in different layers. In this instance, the metal patterns 130, 135 and the second bridge pattern 105 are arranged in different layers and the metal patterns 130 and 135 directly contact the first bridge electrode 120, without using any insulating film.

Figure 4:
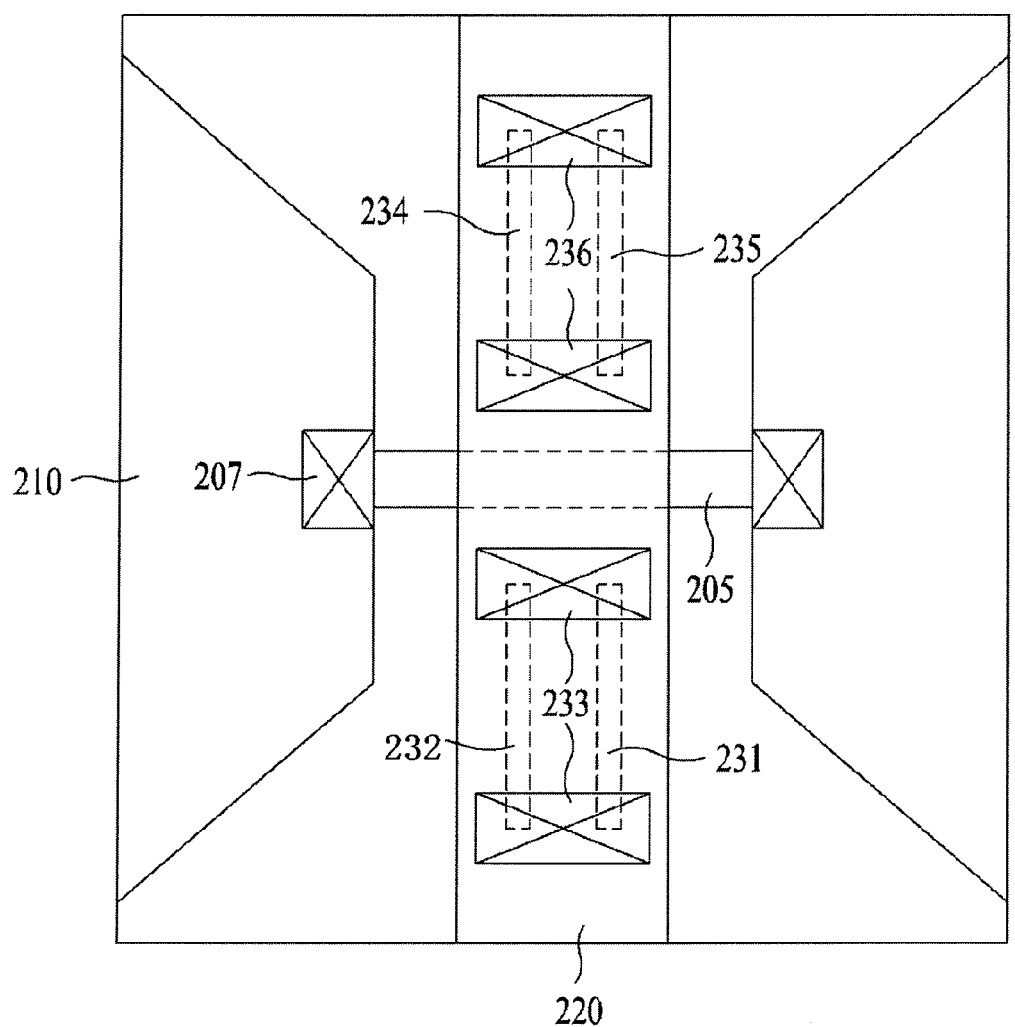
FIG. 4 is a plan view illustrating an electrode intersection of a touch panel according to a second embodiment of the present invention.

FIG. 4 is a plan view illustrating an electrode intersection of a touch panel according to a second embodiment of the present invention.

As shown in FIG. 4, the touch panel of the second embodiment is different from that of the first embodiment in that the first metal patterns 231 and 232 and the second metal patterns 234 and 235 include two metals separated from each other, a third contact portion 233 and a fourth contact portion 236 to connect the metal patterns are provided at both ends of the divided first metal patterns 231 and 232 and the second metal patterns 234 and 235.

The shapes of the first electrode and the second electrode 210, configurations of the first bridge electrode 220 and the second bridge electrode 205, and configuration of the first contact hole 207 in the second bridge electrode 205 and the second electrode 210 are described in the aforementioned first embodiment.

In the second embodiment, unlike the first embodiment, a plurality of metal patterns 231, 232, 234, 235 separated from each other are provided under the first bridge electrode 220, to reinforce electric contact and efficiently decrease resistance, and thereby efficiently prevent or reduce sensing delay.

Each of the third contact portion 233 and the fourth contact portion 236 may be defined by connecting one end of a plurality of metal patterns, and a contact hole for respective metal patterns may be provided on an insulating film between metal patterns and the first electrode 125 arranged thereon.

Figure 5:
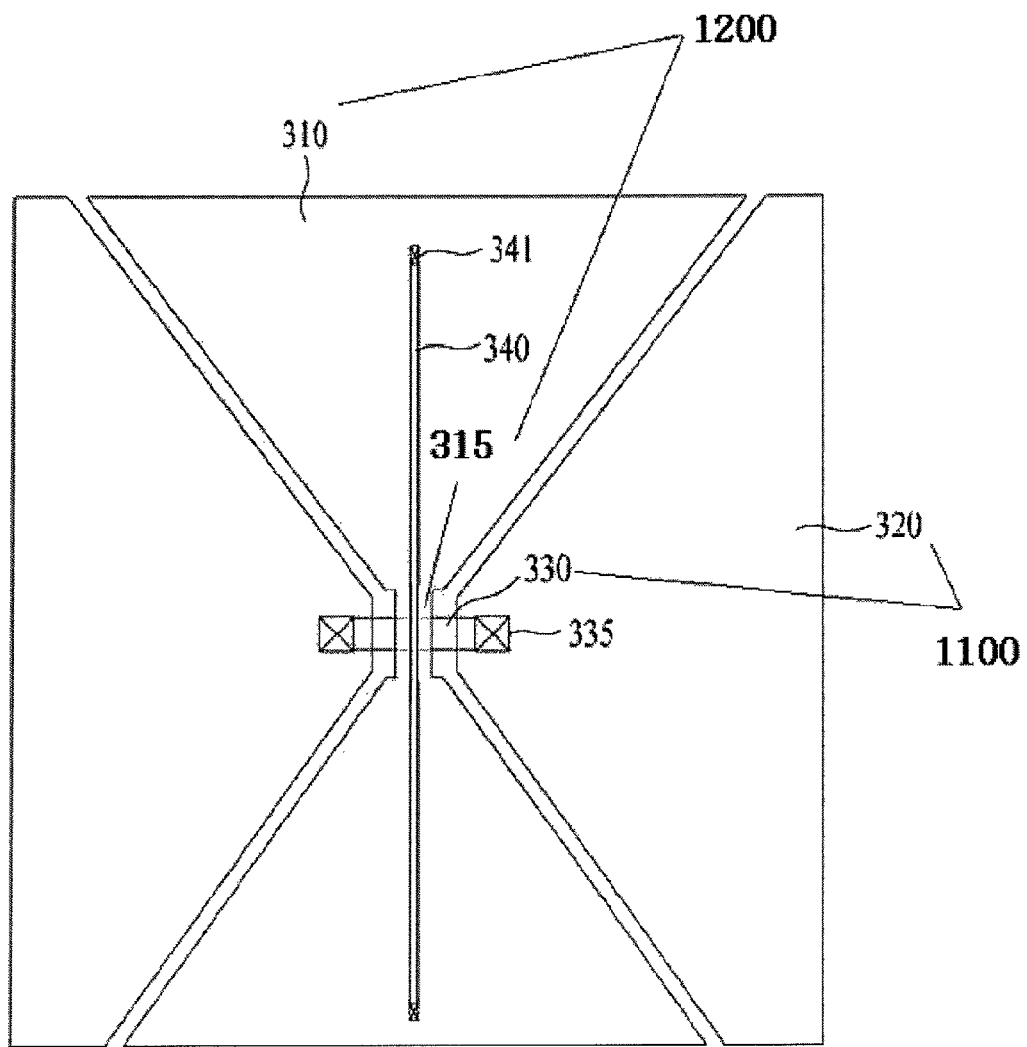
FIG. 5 is a plan view illustrating an electrode intersection of a touch panel according to a third embodiment of the present invention.

FIG. 5 is a plan view illustrating an electrode intersection of a touch panel according to a third embodiment of the present invention.

As shown in FIG. 5, the third embodiment of the present invention includes a first sensor 1200 provided with first electrodes 310 having diamond patterns and a first bridge electrode 315 with a small width to connect the first electrodes 310, a second sensor 1100 crossing the first sensor 1200 and including second electrodes 320 and a second bridge electrode 330 to connect the adjacent second electrode 320, a contact portion between the second bridge electrode 330 and the second electrode 320, and a metal pattern 340 spaced from the second bridge electrode 330, while crossing the second bridge electrode 330.

The metal pattern 340 electrically contacts the first electrode 310 through the contact hole 341. Unlike the aforementioned first embodiment, the metal pattern 340 is formed of one body crossed the second bridge electrode 330, and the metal pattern 340 and the second bridge electrode 330 are formed in different layers, and the metal pattern 340 is thus provided with a contact portion with the metal pattern 340.

In addition, the metal patterns 340 longitudinally extend such that they pass through the first bridge electrode 315 and then the first electrodes 310, as compared to the first and second embodiments. This enables the metal patterns to have a width invisible to the naked eye and be as long as possible, to reduce resistance.

In this instance, intersections between the metal patterns 340 and the second bridge electrode 330 are present. For this reason, the metal patterns 340 and the second bridge electrode 330 are arranged in different layers, thus requiring different masks. At this time, the metal pattern 340 may directly contact the first electrode 310 and the first bridge electrode 315 without using an insulating film. Or the second bridge electrode 330 may directly contact the second electrode 320. This embodiment may eliminate or reduce the need for an additional contact process to bring the metal pattern 340 into contact with the first electrode 310.

Meanwhile, the metal patterns 340 and the second bridge electrode 330 may be formed in different layers. In this instance, they directly contact each other on the first electrode 310 and may be formed of a metal such as molybdenum or a molybdenum alloy.

The first electrode is spaced from the second electrode by a distance of 10 to 30 μm Hereinafter, a method for fabricating a touch panel according to the present invention will be illustrated with reference to the annexed drawings in detail.

Figure 7A:
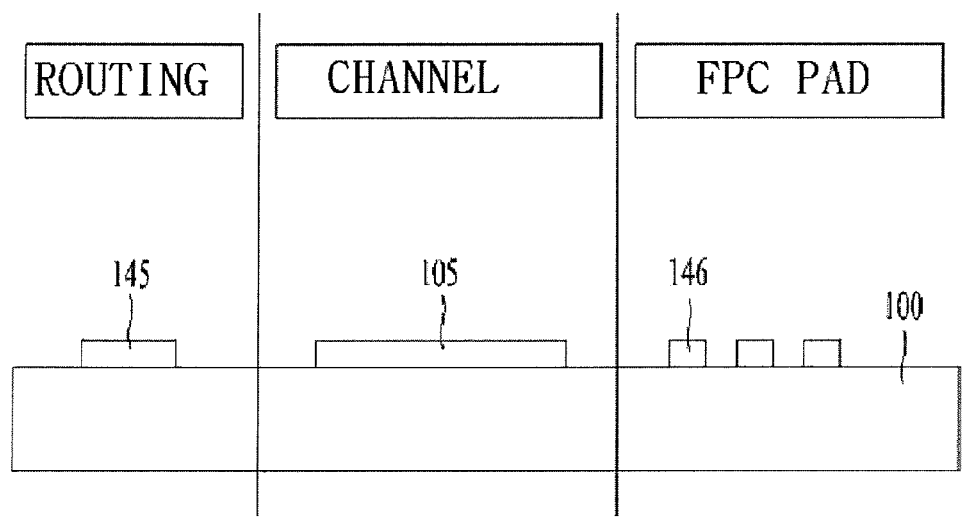
FIGS. 7A to 7C are sectional views corresponding to FIGS. 6A to 6C.
Figure 7B:
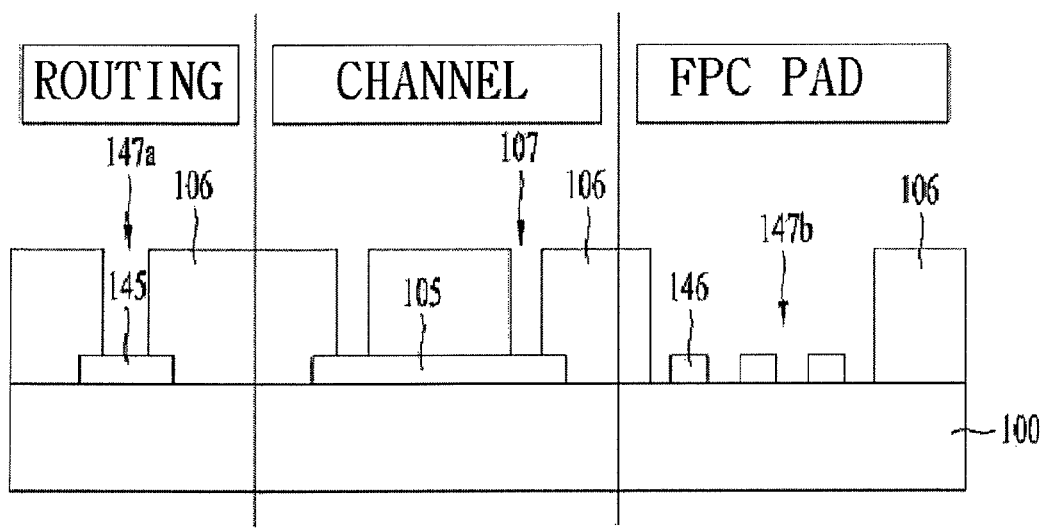
Figure 7C:
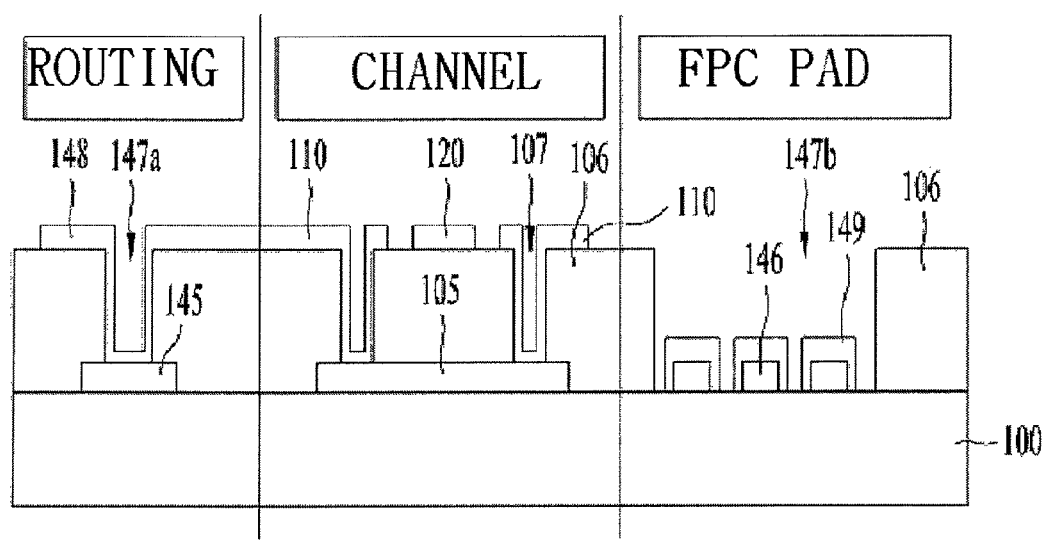

FIGS. 6A to 6C are plan views illustrating an electrode intersection of a touch panel according to the present invention. FIGS. 7A to 7C are sectional views corresponding to FIGS. 6A to 6C.

A plurality of regions in which first electrodes or second electrodes are formed (hereinafter, referred to as "first or second electrode region") having diamond patterns to perform sensing are defined on the substrate 100. The intersection between the first and second electrode regions is defined as a bridge electrode region (channel portion). In addition, the substrate 100 includes an active region, in which the electrodes are formed, at a center and a non-display region surrounding the active region. The non-display region is provided at one side with a pad region.

First, as shown in FIGS. 6A and 7A, a metal is deposited on the substrate 100 and is selectively removed, to form a first metal pattern 130 and second metal pattern 135 spaced from one another in the first direction, and a second bridge electrode 105 between the first and second metal patterns 130 and 135 in the second direction crossing the first direction.

At this time, an FPC pad connection portion having a plurality of pad electrodes 146 is formed in the pad region of the substrate 100, and a routing line 145 is formed at an edge portion of the substrate 100, between the second metal pattern 135 and the second bridge electrode 105, and the FPC pad connection portion.

The metal material may be selected from at least one metal selected from molybdenum (Mo), copper (Cu), silver (Ag), chromium (Cr), aluminum (Al), aluminum neodymium (AlNd) and molybdenum titanium (MoTi), and a laminate including the at least one metal. The metal material is formed to a thickness of about 2,000 Å to about 3,500 Å.

As shown in FIGS. 6B and 7B, an insulating film 106 is deposited on the substrate 100 including the first and second metal patterns 130 and 135, the second bridge electrode 105, the routing line 145 and the pad electrode 146, and the insulating film 106 is selectively removed, to form a first contact hole 107 at both ends of the second bridge electrode 105, a second contact hole (represented by 132 and 137 of FIG. 3B) at both ends of the first and second metal patterns 130 and 135, a third contact hole 147a to define the connection portion of the routing line 145 and a pad electrode open hole 147b.

The insulating film 106 may be an inorganic film such as a nitride film (SiNx), an oxide film (SiOx) or a nitride oxide film (SiNxOy) or an organic thin film composed of a resin and has a thickness of about 2,000 Å to about 7000 Å. When the insulating film 106 is an organic film, it is possible to use resin, in example, including photo acryl resin, with a thickness of about 1~2 μm.

As shown in FIGS. 6C and 7C, a transparent electrode is deposited over the entire surface of the substrate 100 including the first contact hole 107, the second contact holes 132 and 137 (see FIG. 2), the third contact hole 147a and the pad electrode open hole 147b, and is patterned to form first electrodes 125 in the first direction and second electrodes 110 in a second direction crossing the first direction in the electrode regions, and a first bridge electrode 120 to connect the adjacent first electrodes 125 in the first direction. At the same time, a routing contact electrode 148 connected to the third contact hole 147a is formed in the routing portion in order to connect the routing lines 145 to one end of the first electrodes 120 arranged at one end of the adjacent first sensor 1200 and to one end of second electrodes 110 arranged at one end of the second sensor 1100.

The first bridge electrode 120 is formed such that it connects and overlaps the first metal patterns 130 and the second metal patterns 135 in the first direction, also passes over the second bridge electrode 105 in the first direction.

The transparent electrode may be formed of material such as ITO, IZO or ITZO to a thickness of about 100 Å to about 700 Å or about 1,000 Å to about 2,000 Å.

The pad portion is partitioned into two parts to realize operation in two portions on the substrate 100. In this instance, different operation chips correspond to the two parts of the pad portion.

In some cases, the substrate 100 may be present as one portion, or two or more portions. Partitioning of the pad region may be determined depending on the number of pins of chips used.

The touch panel according to the present invention can be formed using at least three masks, without increasing the number of layers and masks, as compared to a conventional structure.

In some cases, like the aforementioned third embodiment of FIG. 5, the number of masks is increased, when metal patterns are formed in separate layers from the second bridge electrode.

Figure 8:
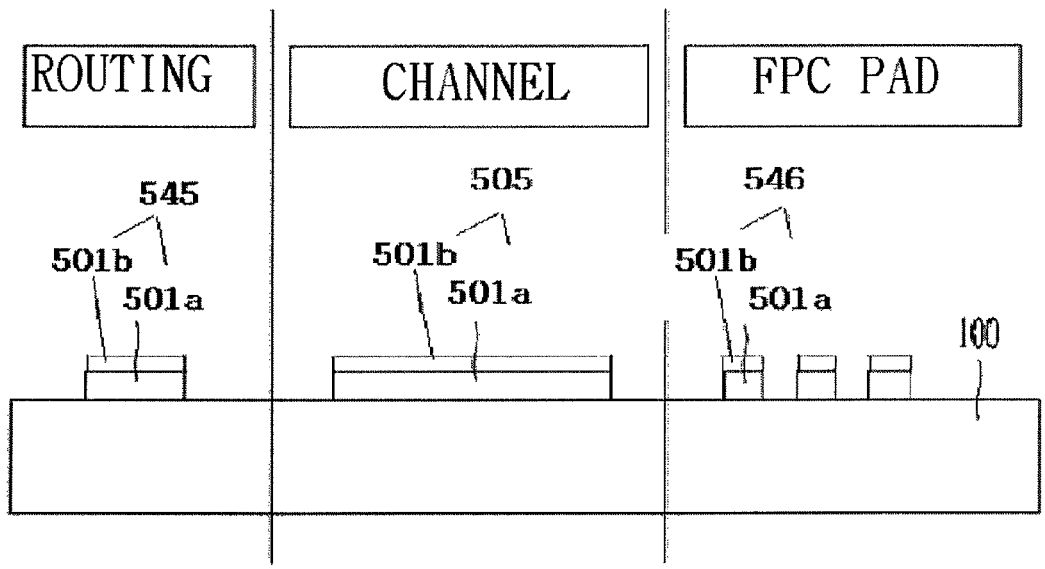
FIG. 8 is a sectional view illustrating a modified embodiment of an electrode of a touch panel according to the present invention.

FIG. 8 is a sectional view illustrating a modified embodiment of an electrode of a touch panel according to the present invention.

FIG. 8 illustrates an example wherein a second bridge electrode 505 and a metal pattern are formed by laminating a chromium film (or layer) 501a and a chromium oxide film (or layer) 501b in this order from the bottom.

In this instance, a routing line 545 and a pad electrode 546 formed in the same layer as the second bridge electrode 505 may also have the same laminate structure.

As such, the reason for formation of the second bridge electrode 505 and the metal patterns using chromium is that chromium exhibits superior absorbance of external light, thus preventing or reducing glare due to reflection of external light and thereby avoiding visible exposure of metal patterns to a user.

Figure 9:
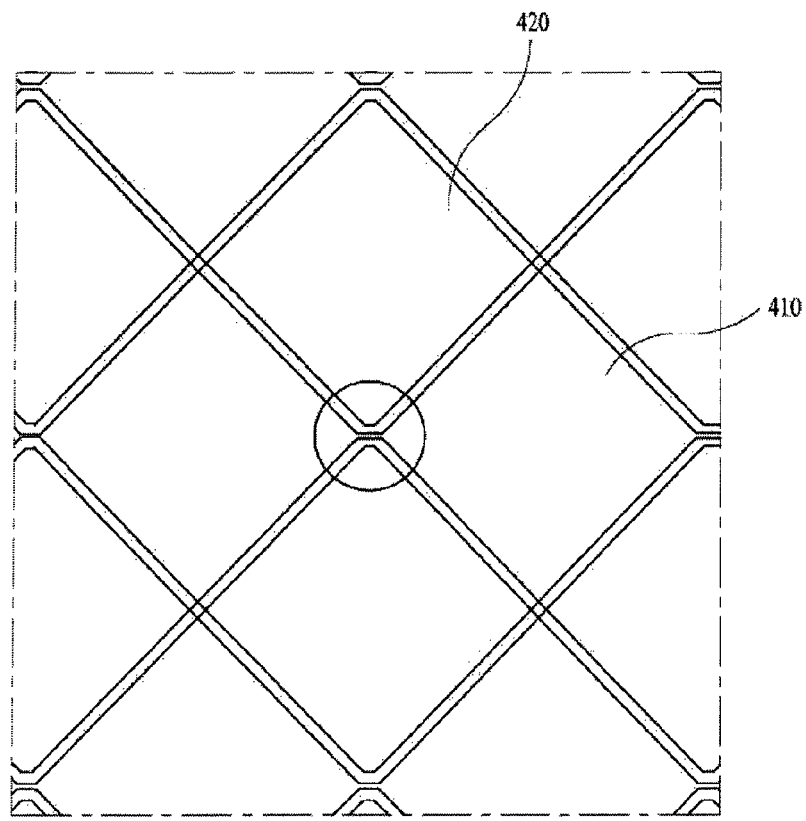
FIG. 9 is a plan view illustrating an electrode intersection of a touch panel according to a fourth embodiment of the present invention.
Figure 10:
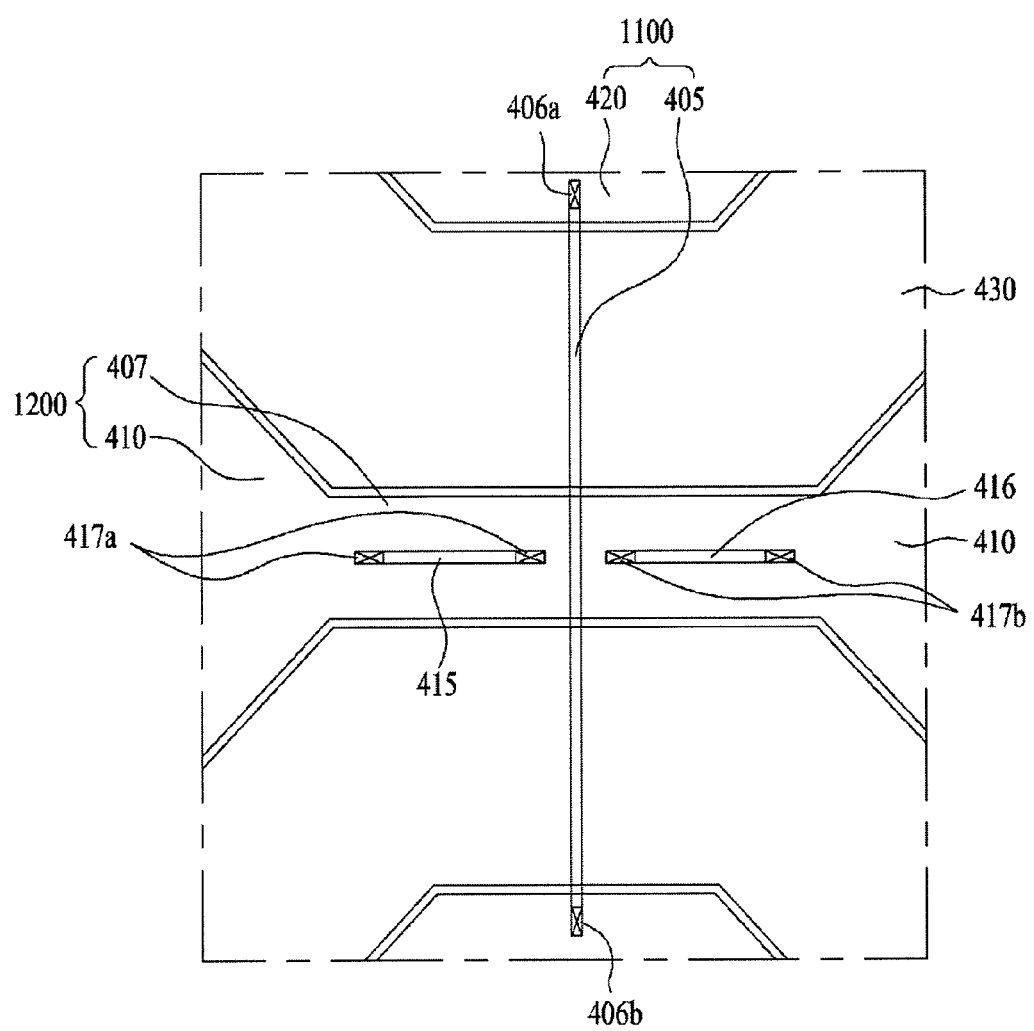
FIG. 10 is an enlarged view illustrating the electrode intersection of FIG. 9.

FIG. 9 is a plan view illustrating an electrode intersection of a touch panel according to a fourth embodiment of the present invention. FIG. 10 is an enlarged view illustrating the electrode intersection of FIG. 9.

Unlike the aforementioned embodiments, the touch panel according to the fourth embodiment of the present invention shown in FIGS. 9 and 10 has a first direction and a second direction as an X axial direction and a Y axial direction, respectively. That is, the touch panel includes a first sensor 1200 including first electrodes 410 arranged in the first direction and a first bridge electrode 407 composed of a transparent electrode to integrally connect the adjacent first electrodes 410, and a second sensor 1100 including second electrodes 420 spaced from one another in the second direction, and a second bridge electrode 405 in the different layer from the second electrode 420. The metal patterns 415 and 416 are arranged in the same layer as the metal patterns 405 and are electrically connected to the first bridge electrode 407 through the second contact holes 417a and 417b. In addition, the second bridge electrode 405 is connected to second electrodes 420 adjacent to both ends thereof through the first and second contact holes 406a and 406b.

In addition, as shown in FIG. 9, when enlarging the intersection between the first and second electrodes 410 and 420, a dummy pattern 430 is further provided between the second electrode 420 and the first electrode 410, first bridge electrode 407.

The dummy pattern 430 floats and is not connected to a routing line, which is further provided to prevent or reduce exposure of patterns caused by the location of spaced first and second electrodes 410 and 420 on the intersection between the second electrode 420 and the first electrode 410, first bridge electrode 407. In this instance, the dummy pattern 430 is composed of a transparent electrode material and has a width of about 10 μm to about 300 μm. The distance between the dummy pattern 430 and the periphery of the first and second electrodes 410 and 420 and the first bridge electrode 407 is preferably about 10 μm to about 30 μm, thus preventing or reducing exposure of patterns of the first and second electrodes 410 and 420 and thus deterioration in capacitance sensing.

The reason for presence of the dummy pattern 430 is as follows. For example, when reflection on the surface of a touch panel formed at various angles toward the panel is tested, in the case where the first electrode 410, the first bridge electrode 407, and the second electrode 420 are spaced from each other by a predetermined width or more, reflection may occur on the external surface. In addition, when the first and second electrodes 410 and 420 are considerably close to each other, diffraction occurs on the interface therebetween, thus causing exposure of interfaces. For this reason, the dummy pattern 430 is designed to be in a floating state without applying any electric signals in order to prevent or reduce exposure of patterns of the first and second electrodes 410 and 420.

The fourth embodiment is different from the aforementioned first embodiment in that the first and second electrodes are rotated 90 degrees and the dummy pattern 430 is further provided.

As mentioned above, for a structure having a connection pattern composed of a transparent electrode, metal patterns electrically connected to the transparent electrode are provided, to decrease resistance of the connection patterns and thus reduce RC delay. As a result, this structure can decrease resistance by about 10 to 20%, as compared to a structure having no such metal patterns.

This means that connection patterns composed of the transparent electrode can be further decreased and the size of diamond patterns composed of a transparent electrode can be decreased in the remaining sensing region.

Accordingly, large-area touch panels, such as PDAs, notebooks, broadly, monitors larger than the size of cellular phones, can sufficiently decrease resistance, thus realizing improved capacitive touch panels.

Recently, the sensing electrode regions have a diagonal line of about 7.5 mm and of 6 mm or less for higher resolution. The resistance of the electrode composed of a transparent electrode further increases. The presence of the metal patterns considerably promotes a decrease in resistance.

In addition, performance of chips is improved and the necessity of reducing resistance is thus increased, although one chip with the identical size is used in the same manner. In this instance, the resistance reduction effects are further increased.

Furthermore, the number of masks used is maintained, without involving additional mask costs and process costs.

In addition, resistance of connection patterns composed of transparent electrodes can be reduced and damage can be prevented or reduced in static electricity testing.

Meanwhile, the aforementioned touch panel may be formed by adhering the touch panel to a liquid crystal panel or forming elements such as electrodes at the back of the liquid crystal panel.

That is, the substrate 100 uses the back surface, which does not cross a liquid crystal layer, of one substrate (generally, a second substrate provided with a color filter array) of a liquid crystal panel.

In this instance, the liquid crystal panel includes first and second substrates (100) crossing each other, a liquid crystal layer filled between the first and second substrates, a thin film transistor array arranged on the first substrate facing the liquid crystal layer and a color filter array arranged on the second substrate facing the liquid crystal layer.

In this instance, the thin film transistor array includes a plurality of gate lines and a plurality of data lines crossing each other to define pixel regions, a thin film transistor (TFT) arranged at the intersection between the gate line and the data line, and a pixel electrode arranged in the pixel region.

In addition, the color filter array includes a black matrix layer, a color filter layer and a common electrode (Vcom (driving voltage)).

In addition, a touch panel provided with the first and second electrodes is provided on the second substrate and a cover glass may be further provided thereon to protect electrodes from external damage.

As such, the liquid crystal display device integrated with a touch panel is preferably, but not necessarily, formed in an on-cell capacitive type wherein a touch panel is arranged on a liquid crystal panel. The substrate of the touch panel uses the second substrate of the liquid crystal panel, thus decreasing the number of substrates used.

In addition, the capacitive touch panel may be a mutual capacitive type or a self-capacitive type. For example, the capacitive-type wherein the first electrode receives a driving voltage and the second electrode senses voltage or capacitance or electric charge varied depending on the presence of touch is defined as a mutual capacitive type, and the capacitive-type wherein the first and second electrodes sequentially receive a driving voltage and the first and second electrodes separately detect variations (voltage or capacitance or electric charge) by the presence of touch is defined as a self-capacitive type.

The touch panel and a liquid crystal display device including the same according to the present invention have the following advantages.

First, for a capacitive touch panel wherein electrodes are arranged in the form of diamond patterns crossing each other, one sensor is formed by integrating diamond-shaped electrodes with a bridge electrode to connect the electrodes using a transparent electrode, and other sensor is formed by spacing diamond-shaped electrodes and electrically connecting the adjacent electrodes of the other sensors to each other using a bridge electrode composed of a metal in a separate layer. In this instance, a metal pattern is further provided under the bridge electrode composed of the transparent electrode, and the metal pattern contacts the bridge electrode, to reduce resistance generated from the bridge electrode and thus primarily prevent or reduce RC delay caused by increased resistance. As a result, sensing rate of each electrode is made uniform and thus sensitivity and touch sensing can thus be improved.

Second, when the sensors have different lengths, difference in resistance between the sensors can be minimized, sensitivity therebetween can be made uniform and accuracy of touch sensing can thus be improved, by controlling the length and width of the metal pattern arranged under the sensor having a higher resistance.

Third, if present, metal patterns are composed of a metal having a specific resistance 1/20 or less that of a transparent electrode, thus considerably reducing resistance of the bridge electrode region composed of a transparent electrode material.

Fourth, the metal bridge electrode and the metal patterns are composed of chromium which exhibits superior absorbance of external light or a laminate including the same, thus preventing or reducing glare due to reflection of external light and thereby improving visibility.

Fifth, resistance is decreased in a transparent electrode connection portion between diamond patterns, thus preventing or reducing damage to bridge electrodes composed of a transparent electrode material in static electricity testing.

Sixth, ultimately, the total resistance of electrodes is decreased and the difference in resistance between connections portions is decreased, thus minimizing sensing delay by resistance and realizing large-area capacitive-type touch panels.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A touch panel, comprising:
    a plurality of first sensors disposed on a substrate, the plurality of first sensors including a plurality of first electrodes spaced from one another in a first direction and a first connection pattern to connect two adjacent first electrodes, wherein the first electrodes and the first connection pattern are made of a transparent electrode in a same layer;
    a plurality of second sensors disposed on the substrate, the plurality of second sensors including a plurality of second electrodes spaced from one another in a second direction and a second connection pattern composed of a metal to connect two adjacent second electrodes, wherein the first direction and the second directions are crossing each other and wherein the plurality of second electrodes are made of the transparent electrode;
    a first metal pattern having a first end and a second end, and a second metal pattern having a first end and a second end, each of the first ends and the second ends of the first and second metal patterns being connected to the first connection pattern, wherein the first metal pattern and the second metal pattern are spaced from each other in the first direction and overlap lengthwise in the same direction as the first connection pattern, wherein a first portion of the first connection pattern connects the first end and the second end of the first metal pattern, wherein a second portion of the first connection pattern connects the first end and the second end of the second metal pattern, and wherein the first and second metal patterns are formed on the same layer and of the same material as the second connection pattern; and
    an insulating layer disposed between a layer of the second connection pattern and the first and second metal patterns, and a layer of the first connection pattern, wherein the insulation layer has contact holes to respectively expose the each of the first ends and the second ends of the first and second metal patterns, and the each of the first ends and the second ends of the first and second metal patterns are connected to the first connection pattern via the contact holes of the insulating layer,
    wherein the first and second metal pattern reduce resistance of the first connection pattern,
    wherein the second connection pattern passes a region spaced between the first metal pattern and the second metal pattern, and
    wherein the second connection pattern is separated from each of the first and second metal patterns.

2. The touch panel according to claim 1, further comprising a contact portion in the insulating layer corresponding to both ends of the second connection pattern, to connect the second connection pattern to the two adjacent second electrodes.

3. The touch panel according to claim 1, wherein the first metal pattern and the second metal pattern are respectively plural in number.

4. The touch panel according to claim 1, further comprising:
    a pad arranged at one side of the substrate; and
    a routing line to connect the pad to one end of one of the plurality of first sensors or one of the plurality of second sensors,
    wherein the second connection pattern, the first and second metal patterns, the pad and the routing line are formed on the same layer and are of the same metal.

5. The touch panel according to claim 1, further comprising a dummy pattern composed of a transparent electrode arranged between at least one of the plurality of first electrodes and at least one of the plurality of second electrodes adjacent thereto.

6. The touch panel according to claim 5, wherein the dummy pattern is floating.

7. The touch panel according to claim 1, wherein a third portion of the first connection pattern connects the second end of the first metal pattern to the first end of the second metal pattern.

8. A liquid crystal display device, comprising:

a liquid crystal panel including a first substrate, a second substrate, and a liquid crystal layer disposed between the first and second substrates;

an insulating layer arranged on a surface of the second substrate;

a plurality of first sensors disposed on the insulating layer, the plurality of first sensors including a plurality of first electrodes spaced from one another in a first direction and a first connection pattern to connect two adjacent first electrodes, wherein the first electrodes and the first connection pattern are made of a transparent electrode in a same layer;

a plurality of second sensors, the plurality of second sensors including a plurality of second electrodes on the insulating layer spaced from one another in a second direction and a second connection pattern composed of a metal to connect two adjacent second electrodes on the substrate, wherein the first direction and the second directions are crossing each other and wherein the plurality of second electrodes are made of the transparent electrode;

a first metal pattern and a second metal pattern on the substrate, the first metal pattern having a first end and a second end, and the second metal pattern having a first end and a second end each of the first ends and the second ends of the first and second metal patterns being connected to the first connection pattern, wherein the first metal pattern and the second metal pattern are spaced from each other in the first direction and overlap lengthwise in the same direction as the first connection pattern, wherein a first portion of the first connection pattern connects the first end and the second end of the first metal pattern, wherein a second portion of the first connection pattern connects the first end and the second end of the second metal pattern, and wherein the first and second metal patterns are formed on the same layer and of the same material as the second connection pattern; and a first contact portion in the insulating layer to connect both ends of the second connection pattern to the adjacent second electrodes, and a second contact portion in the insulating layer to connect both ends of each of the first and second metal patterns to the first connection pattern, wherein the insulation layer further has contact holes to respectively expose the each of the first ends and the second ends of the first and second metal patterns, and the each of the first ends and the second ends of the first and second metal patterns are connected to the first connection pattern via the contact holes of the insulating layer, wherein the first and second metal pattern reduce resistance of the first connection pattern, wherein the second connection pattern passes a region spaced between the first metal pattern and the second metal pattern, and wherein the second connection pattern is separated from each of the first and second metal patterns.

9. The liquid crystal display device according to claim 8, further comprising:

a pad arranged at one side of the second substrate; and a routing line to connect the pad to one end of one of the plurality of first sensors or one of the plurality of second sensors, wherein the second connection pattern, the at least one metal pattern, the pad and the routing line are formed on the same layer and are of the same metal.

10. The liquid crystal display device according to claim 8, wherein a third portion of the first connection pattern connects the second end of the first metal pattern to the first end of the second metal pattern.

* * * * *